April 20, 1954     D. W. HAMM     2,676,076
INTERLOCKING SPACER AND EXPANDER PISTON RING
Filed June 11, 1953
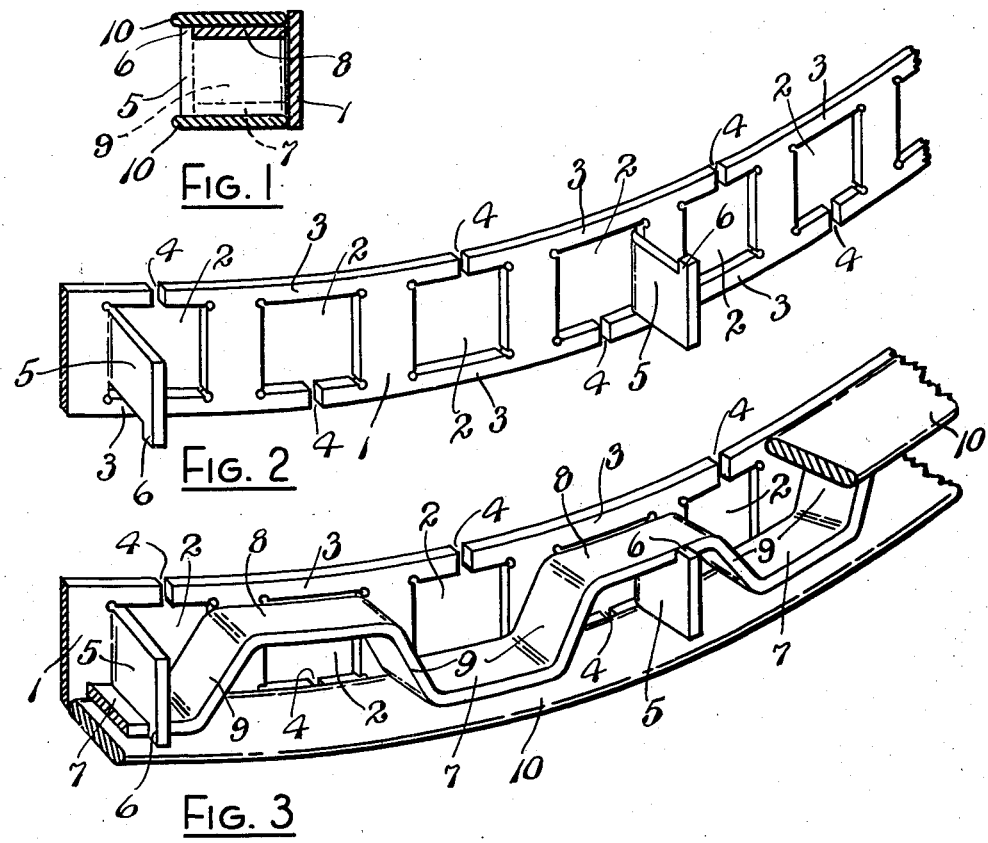
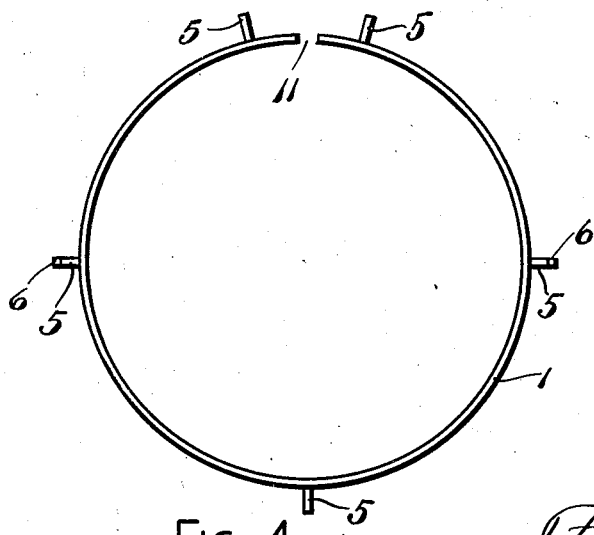
INVENTOR
DOUGLAS W. HAMM
BY
*Frank E. Liverance, Jr.*
ATTORNEY Patented Apr. 20, 1954

2,676,076

UNITED STATES PATENT OFFICE 2,676,076

INTERLOCKING SPACER AND EXPANDER PISTON RING

Douglas W. Hamm, Muskegon, Mich., assignor to Muskegon Piston Ring Company, Muskegon, Mich., a corporation of Michigan Application June 11, 1953, Serial No. 361,014

5 Claims. (Cl. 309—45)

This invention relates to an interlocking spacer and expander in conjunction with piston rings of the so-called oil ring type.

In the lower ring grooves of a piston, such grooves having connecting passages through the walls of the piston to the interior thereof, it is generally universal practice to install therein a vented oil ring, which has passages for the flow of lubricating oil through it and thence to the interior of the piston and which piston ring, in its structure, includes two spaced generally circular parted metallic rails located in parallel horizontal planes and adapted at their outer curved edges to be pressed against the walls of a cylinder, scraping excess oil therefrom and thus prevent lubricating oil being consumed by passage to the combustion chamber above the piston where it is burned, making smoky exhaust and producing carbon in addition to the additional expense due to unnecessary consumption of lubricating oil.

It is an object and purpose of the present invention to provide a novel and useful structure of a combined expander and spacer, the spacer being located between the steel rails to hold them apart in parallel horizontal planes, and the expander forcing against the inner edges of the rails causing them to bear with a predetermined unit pressure against the cylinder wall with which associated. Because of interlocking connection and engagement of the novel expander member with the spacer, the two may be installed together in a ring groove overcoming many of the difficulties of installation and saving time and resultant expense.

An understanding of the invention and a preferred form thereof may be had from the following description, taken in connection with the accompanying drawing, in which, Fig. 1 is a transverse section through a piston ring having the steel rails and the interlocked expander member and spacer of my invention.

Fig. 2 is a fragmentary perspective view of a section of the parted, generally circular expander member of my invention.

Fig. 3 is a similar perspective view showing the spacer interlocked or interconnected with the expander member, and with the steel rails in place as they will be used in the completed piston ring, and Fig. 4 is a plan view illustrating the circular form and parting in the piston ring expander member together with the tongues extending radially outward therefrom with which the spacer member is interconnected.

Like reference characters refer to like parts in the different figures of the drawing.

In the construction, an elongated member or band 1 of thin metallic ribbon stock is formed into generally circular form. In succession in the length thereof a plurality of openings 2 spaced from each other are made, the height of which is less than the width of the member 1. This leaves ties 3 at the upper and lower sides of the member 1 over and under the openings 2. Alternate upper and lower ties are cut across between their ends to make the spaces or slots 4 in staggered relationship to each other. That is, the ties which are cut across at the upper edge portion of the band member 1 are staggered with those at the lower edge portions thereof, so that each opening has a slot leading thereto alternately at the upper and lower sides of the successive openings.

Around the band 1, at selected spaced distances, tongues 5 are struck outwardly which may be integral with the member 1 at selected openings 2 by cutting the tongues from the member 1 at three sides of the openings 2 and bending them outwardly radially at the remaining integrally connected side. These tongues are not provided at all of the openings 2 but in general a limited number of them may be used, for example, in Fig. 4, five are shown, two of them adjacent each end of the member 1 while the others are spaced from each other substantially 90 degrees apart. The number of tongues 5 that are used is not critical in connection with the invention.

The tongues 5 are cut, part of them, at their upper and others at their lower edges, away from the member 1 outwardly toward but short of their free outer ends, leaving projections 6. Part of said projections extend upwardly and others downwardly as shown in Fig. 3. The height of the projections 6 is equal substantially to the thickness of the material from which the about to be described spacer is made. The vertical dimension of the ties 3 may be equal substantially to the thickness of the thin rails which are used in completing the assembly of the piston ring, though this is not absolutely essential. The distance between such member 1 and the inner edges of the tongues 6 is equal to the width of the material from which the spacer is made.

The spacer is made from a length of flat metal in corrugated form, the corrugations being alternately closed at their lower and upper ends by spaced horizontal sections 7 and 8. Such sections 7 and 8 are integrally connected by generally vertical legs 9. The sections 7 and 8 are in spaced horizontal planes and the tongues 5 may extend over the lower sections 7 with the projections 6 extending downwardly at the outer edges of selected sections 7, while others of the tongues 5 will extend outwardly underneath selected upper sections 8 with the projections 6 extending upwardly at the outer edges thereof (see Fig. 3). This interlocks the spacer with the inner member which is of a circumferentially compressible character and may be resistingly contracted to a smaller circumference, the spaces at 4 being narrowed when such contraction takes place. The lower and upper ends of the projections 6 relative to the sections 7 and 8 with which they are associated are in the planes of the lower sides of the sections 7 and of the upper sides of the sections 8.

A parted steel rail 10 is placed around the inner member 1 lying over the upper sections 8 and coming at its inner curved edges against the upwardly extending ties 3. A second rail is located below the sections 7 and, similarly, at its inner edges comes against the lower ties 3 below the openings 2.

The parting at 11 in the inner circumferentially compressible band member 1 is closed when such member is circumferentially contracted, being in abutting relationship or held in such relationship so that the two ends of the band 1 do not separate. Similarly, the steel rails are divided or parted, as is usual with such rails in piston rings, and the corrugated spacer is likewise parted or divided across at one side.

When installed in the ring groove of a piston, the band 1, contracted to a lesser circumference than what it normally takes, has force engendered therein which tends to restore it to its normal greater circumference. This results in an outward radial pressure being made on the rails 10 at their inner edges so that at their outer edges they bear with a desired unit pressure against the cylinder walls. The rails are held in parallel horizontal planes between the sections 7 and 8 of the spacer and the upper and lower sides of the piston ring groove in which the ring is installed.

The installation is effectuated by the inner member, which is a combined expander and carrier of the spacer being interconnected with the spacer so that it does not disengage therefrom. When thus connected together they provide a single installation unit which may be entered into a piston ring groove with the rails which may be cemented to the horizontal sections 7 and 8 of the spacer, using a cement which softens and dissolves in an engine after installing under the effects of high temperature and lubricating oil. The construction is readily manufactured economically, has full and complete venting passage for lubricating oil and is very effective for oil salvaging in connection with internal combustion engines, pistons and cylinders.

The invention is defined in the appended claims and is to be considered comprehensive of all forms of structure coming within their scope.

I claim:

1. A circumferentially compressible, parted, generally circular band, spaced tongues extending outwardly from and each connected at one end to said band, a generally circular parted spacer located at the outer side of said band passing over selected tongues and under other tongues, and retaining means on said tongues engaging said spacer at outer portions thereof to hold said spacer therebetween and the band.

2. A circumferentially compressible, parted, generally circular, vertically located band, spaced tongues connected to and extending radially outward from said band, the height of said tongues at their outer free ends being less than the width of said band by a predetermined amount, said tongues at upper and lower edges, at their outer ends, being a substantially equal distance below the upper edge and above the lower edge of the band, respectively, a corrugated spacer having alternate upper and lower spaced horizontal sections connected at adjacent ends by generally vertical sections located at its inner edges against said band, selected upper horizontal sections thereof passing over selected tongues and selected lower horizontal sections under other tongues, said tongues over and under which said spacer passes at upper and lower edge portions thereof, respectively being recessed for seating said spacer horizontal sections, the radial dimension of the spacer being less than the radial length of said tongues.

3. Structure having the elements in combination defined in claim 2, and a parted, generally circular thin rail located around said band, one above the upper horizontal sections and another below the lower horizontal sections of the spacer, the inner edges of said rails engaging against said band.

4. A parted, generally circular metallic band, resistingly yielding for contraction to a smaller than free normal circumference, a parted, generally circular spacer around the band located thereagainst, spaced members connected to and extending outwardly from the band passing through said spacer, and means at the outer ends of said members engaging said spacer to releasably hold said spacer in connection with said band.

5. A parted, generally circular, metallic band resistingly yielding for contraction to a smaller than normal free circumference, said band having spaced openings therethrough, and having spaced outwardly extending tongues integral with said band at selected openings therein, a parted generally circular spacer around the band located thereagainst, said tongues passing through said spacer, and a projection at the outer end of each of said tongues engaging the spacer at outer sides thereof holding the spacer in generally fixed relation to said band.

No references cited.